(12) United States Patent
MacLennan et al.

(10) Patent No.: US 12,351,114 B2
(45) Date of Patent: Jul. 8, 2025

(54) VEHICLE REMOTE POWER SUPPLY SYSTEMS WITH INTEGRATED RETRACTABLE EXTENSION CORDS

(71) Applicant: FORD GLOBAL TECHNOLOGIES, LLC, Dearborn, MI (US)

(72) Inventors: Wendy Lynn MacLennan, Northville, MI (US); Vijay Kumar Chimakurthy, Novi, MI (US); Kartik Bagga, Plymouth, MI (US); Samuel Joseph Johnson, Caliente, NV (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 130 days.

(21) Appl. No.: 17/845,122

(22) Filed: Jun. 21, 2022

(65) Prior Publication Data

US 2023/0406235 A1 Dec. 21, 2023

(51) Int. Cl.
*B60R 16/02* (2006.01)
*H02G 3/08* (2006.01)
*H02H 1/00* (2006.01)
*H02H 5/04* (2006.01)

(52) U.S. Cl.
CPC .............. *B60R 16/02* (2013.01); *H02G 3/08* (2013.01); *H02H 1/0007* (2013.01); *H02H 5/04* (2013.01)

(58) Field of Classification Search
CPC ..................................................... B60R 16/02
See application file for complete search history.

(56) References Cited

U.S. PATENT DOCUMENTS

| 5,803,216 | A | 9/1998 | McNaught |
| 6,848,937 | B1 | 2/2005 | Hsiao |
| 9,007,020 | B2 | 4/2015 | Prosser et al. |
| 9,490,659 | B1* | 11/2016 | English ............ H02J 7/35 |
| 10,501,032 | B2 | 12/2019 | Secord |
| 11,046,197 | B2 | 6/2021 | Kobayashi |
| 2013/0020993 | A1* | 1/2013 | Taddeo ............ B60L 53/65 |
| | | | 320/109 |

(Continued)

FOREIGN PATENT DOCUMENTS

WO 2021091811 A1 5/2021

*Primary Examiner* — Daniel Kessie
(74) *Attorney, Agent, or Firm* — David B. Kelley; Carlson, Gaskey & Olds, P.C.

(57) ABSTRACT

Remote power supply systems are provided for motor vehicles for powering auxiliary devices separate from the vehicles. Exemplary remote power supply systems may include one or more exportable power outlet boxes that include electrical power outlets for connecting the auxiliary devices. The electrical power outlets may be powered by a generator system of the vehicle. A retractable power extension cord may be connected to one or more of the electrical power outlets for repositioning the electrical power outlets at a distance away from the vehicle. Users may also supply their own extension cord, in which case a human machine interface of the system may allow the users to enter extension cord-related parameters. A control module of the system may determine a maximum recommended power limit of the extension cord based on known cord-related parameters. The control module may further issue alerts or power shutdown commands when certain extension cord overload or overtemperature conditions exist.

18 Claims, 3 Drawing Sheets

(56) References Cited

U.S. PATENT DOCUMENTS

| | | | |
|---|---|---|---|
| 2015/0048792 A1* | 2/2015 | Alford | B60L 3/04 |
| | | | 320/109 |
| 2016/0097798 A1* | 4/2016 | Szatkowski | G01R 31/088 |
| | | | 324/543 |
| 2016/0223588 A1* | 8/2016 | Fox | G01R 31/58 |
| 2020/0079299 A1 | 3/2020 | Salter et al. | |

* cited by examiner

VEHICLE REMOTE POWER SUPPLY SYSTEMS WITH INTEGRATED RETRACTABLE EXTENSION CORDS

TECHNICAL FIELD

This disclosure is directed to motor vehicles, and more particularly to remote power supply systems for powering auxiliary devices separate from the vehicle.

BACKGROUND

Some motor vehicles include electrical power outlets that can be used to power auxiliary devices or loads located external to the vehicle. A generator system of the vehicle can operate in a power generation mode to provide power to the electrical power outlets. The electrical power outlets can be particularly useful for commercial vehicles and work trucks that are often at job sites and other areas that may lack an available grid power source. When at such sites, a user can power tools and other auxiliary devices through the vehicle's electrical power outlets.

SUMMARY

A vehicle remote power transfer system according to an exemplary aspect of the present disclosure includes, among other things, an exportable power outlet box including an electrical power outlet, and a retractable power extension cord operably connected to the electrical power outlet and including a reel and a retractable cord. The retractable cord includes a first portion unwound from the reel and a remaining coiled portion wound onto the reel. A control module is programmed to determine a maximum recommended power limit of the retractable cord based on a length of the remaining coiled portion.

In a further non-limiting embodiment of the forgoing vehicle remote power transfer system, the electrical power outlet is movable to a location away from the exportable power outlet box by the retractable cord.

In a further non-limiting embodiment of either of the foregoing vehicle remote power transfer systems, a sensor system is configured to infer the length of the remaining coiled portion based on a spring force or a number of wheel revolutions of the reel.

In a further non-limiting embodiment of any of the foregoing vehicle remote power transfer systems, the sensor system provides sensor input data to the control module for determining the maximum recommended power limit.

In a further non-limiting embodiment of any of the foregoing vehicle remote power transfer systems, the control module is further programmed to command an alert when an actual amount of power being transferred through the retractable cord is within a predefined percentage of the maximum recommended power limit.

In a further non-limiting embodiment of any of the foregoing vehicle remote power transfer systems, the alert is presented on a human machine interface or a personal electronic device that is operably linked to the vehicle remote power transfer system.

In a further non-limiting embodiment of any of the foregoing vehicle remote power transfer systems, the control module is further programmed to communicate a shutdown signal to a generator system of the vehicle remote power transfer system when an actual amount of power being transferred through the retractable cord exceeds a predefined power overload threshold of the retractable cord.

A vehicle remote power transfer system according to another exemplary aspect of the present disclosure includes, among other things, an exportable power outlet box including an electrical power outlet, a retractable power extension cord operably connected to the electrical power outlet and including a reel and a retractable cord, a sensor system configured to monitor a temperature associated with the retractable power extension cord, and a control module programmed to command an alert when an increase of the temperature exceeds a predefined temperature increase threshold.

In a further non-limited embodiment of the foregoing vehicle remote power transfer system, the sensor system is configured to monitor the temperature as power is being transferred through the retractable cord.

In a further non-limiting embodiment of either of the foregoing vehicle remote power transfer systems, the control module is further programmed to communicate a shutdown signal to a generator system of the vehicle remote power transfer system when the temperature exceeds a predefined temperature threshold.

In a further non-limiting embodiment of any of the foregoing vehicle remote power transfer systems, the control module is further programmed to re-enable a power transfer through the retractable cord when the temperature no longer exceeds the predefined temperature threshold.

In a further non-limiting embodiment of any of the foregoing vehicle remote power transfer systems, the alert is presented on a human machine interface or a personal electronic device that is operably linked to the vehicle remote power transfer system.

In a further non-limiting embodiment of any of the foregoing vehicle remote power transfer systems, the electrical power outlet is movable to a location away from the exportable power outlet box by the retractable cord.

A vehicle remote power transfer system according to another exemplary aspect of the present disclosure includes, among other things, an exportable power outlet box including an electrical power outlet, an extension cord connected to the electrical power outlet, a human machine interface operable to receive a user input of a parameter associated with the extension cord, and a control module programmed to determine a maximum recommended power limit of the extension cord based at least on the parameter.

In a further non-limiting embodiment of the foregoing vehicle remote power transfer system, the parameter includes a cord length of the extension cord.

In a further non-limiting embodiment of either of the foregoing vehicle remote power transfer systems, the parameter includes a gauge of wire provided within the extension cord.

In a further non-limiting embodiment of any of the foregoing vehicle remote power transfer systems, the parameter includes a power rating of the extension cord.

In a further non-limiting embodiment of any of the foregoing vehicle remote power transfer systems, the control module is further programmed to command an alert when an actual amount of power being transferred through the extension cord is within a predefined percentage of the maximum recommended power limit.

In a further non-limiting embodiment of any of the foregoing vehicle remote power transfer systems, the alert is presented on the human machine interface or a personal electronic device that is operably linked to the vehicle remote power transfer system.

In a further non-limiting embodiment of any of the foregoing vehicle remote power transfer systems, the control module is further programmed to communicate a shutdown signal to a generator system of the vehicle remote power transfer system when an actual amount of power being passed through the extension cord exceeds a predefined power overload threshold of the extension cord.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to remote power supply systems for motor vehicles. The remote power supply systems may be utilized for powering auxiliary devices separate from the vehicle. Exemplary remote power supply systems may include one or more exportable power outlet boxes that include electrical power outlets for connecting the auxiliary devices. The electrical power outlets may be powered by a generator system of the vehicle. A retractable power extension cord may be connected to one or more of the electrical power outlets for repositioning the electrical power outlets at a distance away from the vehicle. A human machine interface of the system may allow users to enter extension cord-related parameters. A control module of the system may determine a maximum recommended power limit of the cord based on known cord-related parameters. The control module may further issue alerts or power shutdown commands when certain overload or overtemperature conditions exist. These and other features of this disclosure are discussed in greater detail in the following paragraphs of this detailed description.

Figure 1:
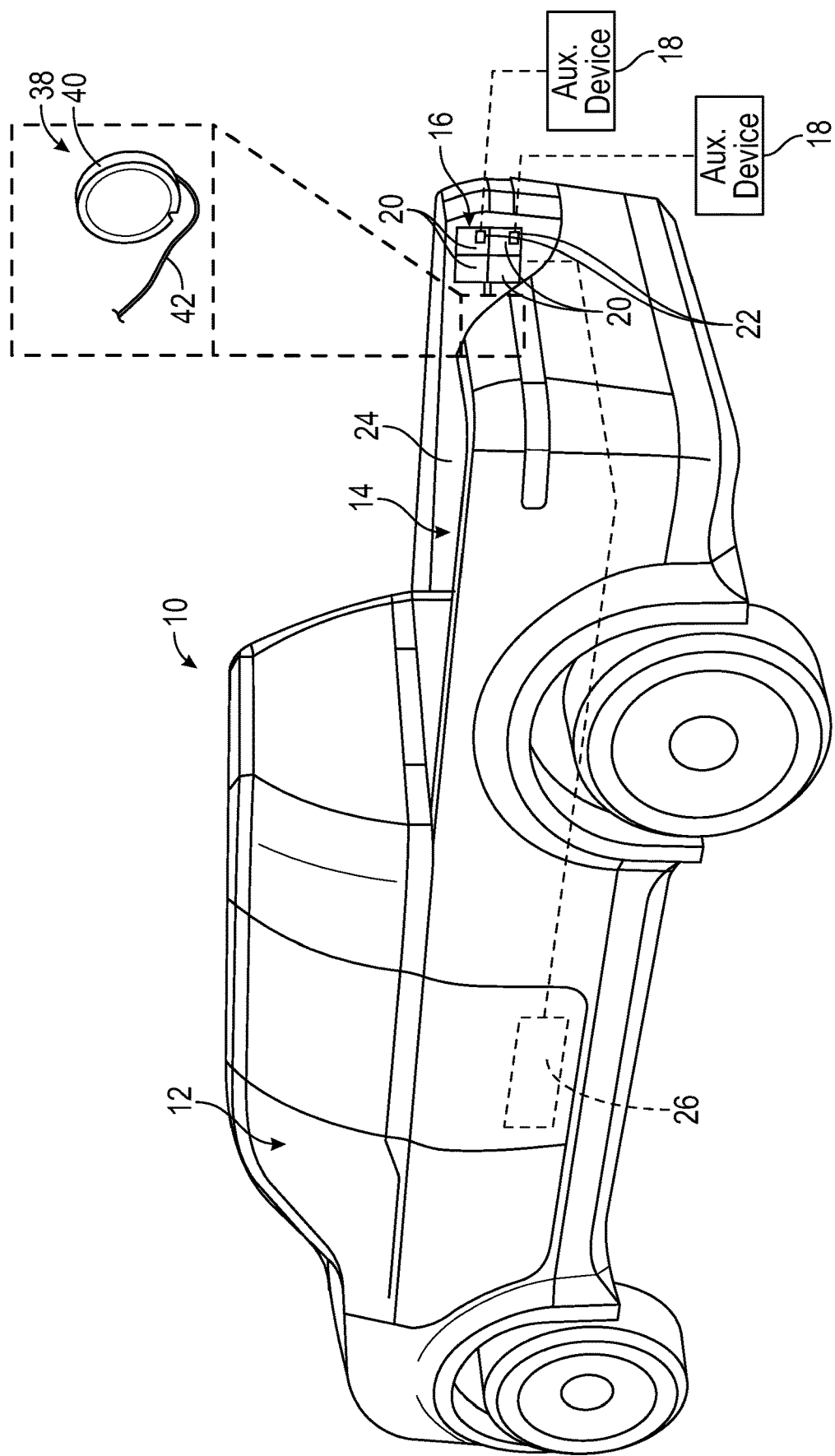
FIG. 1 schematically illustrates a motor vehicle.

FIG. 1 schematically illustrates a motor vehicle 10 that includes a passenger cabin 12 and a cargo space 14 located rearward of the passenger cabin 12. The vehicle 10 could be a conventional, internal combustion engine powered vehicle, a traction battery powered electric or hybrid vehicle, an autonomous vehicle (i.e., a driverless vehicle), etc.

In an embodiment, the vehicle 10 is a pickup truck, and therefore the cargo space 14 may be established by a cargo bed of the pickup truck. However, other vehicle configurations are also contemplated within the scope of this disclosure. For example, the vehicle 10 could be configured as a car, a truck, a van, a sport utility vehicle (SUV), etc.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component or system.

The vehicle 10 may include one or more exportable power outlet boxes 16. Each exportable power outlet box 16 may be part of a remote power supply system (see FIG. 5) of the vehicle 10 that is configured for powering auxiliary devices 18 located external to/remote from the vehicle 10. The auxiliary devices 18 could be any electrically powered device, including but not limited to, extension cords, construction tools, powered lawn equipment, recreational devices, campers or trailers, etc. Each exportable power outlet box 16 may include one or more electrical power outlets 20 that provide an interface for connecting the auxiliary devices 18. A user can couple a plug 22 of the auxiliary device 18 to one of the electrical power outlets 20 for powering the auxiliary device 18 using power originating from the vehicle 10. The electrical power outlets 20 may include 120V outlet ports, 240V outlet ports, USB ports, etc., or any combination of these or other power outlet ports.

Each exportable power outlet box 16 provided on the vehicle 10 may be mounted to a surface 24 of the vehicle 10. The surface 24 could be located anywhere on the vehicle 10, including any location within either the passenger cabin 12 or the cargo space 14. In an embodiment, the surface 24 is established by a side wall of a cargo bed of the vehicle 10. However, other configurations are further contemplated within the scope of this disclosure.

The vehicle 10 may further include a generator system 26, which may be part of a powertrain of the vehicle 10. The generator system 26 may be operably coupled to the exportable power outlet box 16 for supplying power to the electrical power outlets 20.

Figure 2:
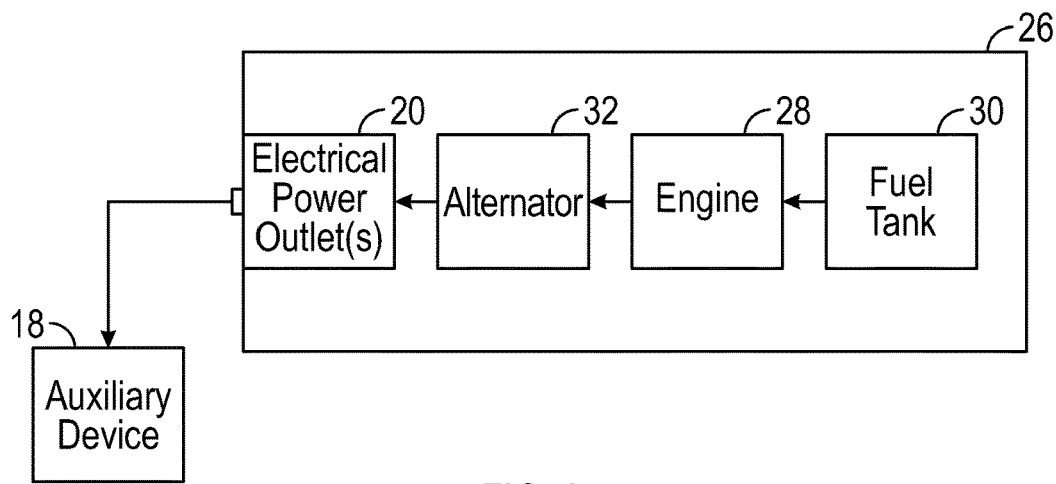
FIG. 2 schematically illustrates aspects of an exemplary generator system of a motor vehicle.

In implementations in which the vehicle 10 is a conventional motor vehicle, the generator system 26 may include an internal combustion engine 28, a fuel tank 30 for storing fuel (e.g., gasoline, diesel, etc.) that may be used to power the internal combustion engine 28, and an alternator 32 (see, e.g., FIG. 2). The alternator 32 may convert mechanical energy from the internal combustion engine 28 into electrical energy that can be utilized to provide power to the electrical power outlets 20 of the exportable power outlet box 16 for powering the one or more auxiliary devices 18. In an embodiment, the alternator 32 is a 28 Volt alternator or battery, and operating the internal combustion engine 28 can generate up to 10 Kilowatts of power through the alternator 32 that can be directed to the power outlet box 16, such as during a power generation mode of the vehicle 10, for example.

Figure 3:
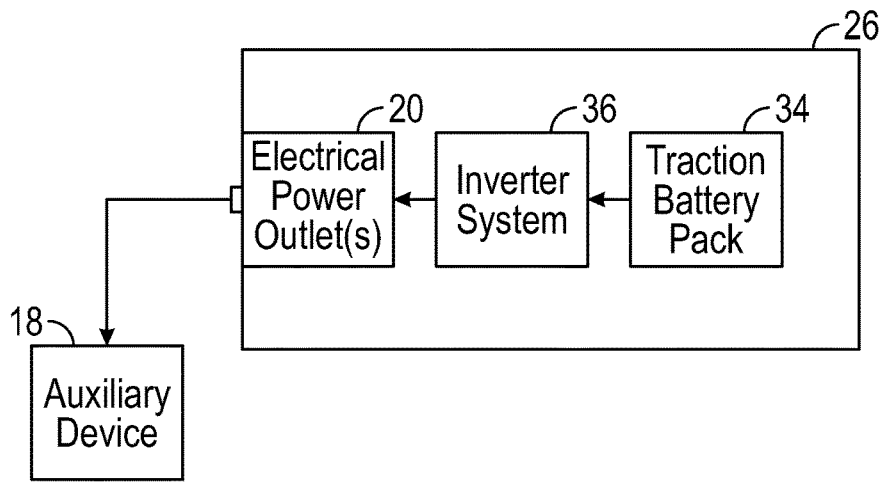
FIG. 3 schematically illustrates aspects of another exemplary generator system of a motor vehicle.

In implementations in which the vehicle 10 is a hybrid or battery electric vehicle, the generator system 26 may include a traction battery pack 34 and an inverter system 36 (see, e.g., FIG. 3). The traction battery pack 34 may be configured as a high voltage traction battery pack that includes a plurality of battery arrays (i.e., battery assemblies or groupings of battery cells) capable of outputting electrical power. The inverter system 36 may enable the transfer of power from the traction battery pack 34 to the exportable power outlet box 16 for supplying power to the electrical power outlets 20 at the correct voltage and current levels for supporting the auxiliary devices 18. The power from the traction battery pack 34 could be supplied to the exportable power outlet box 16 instead of or in addition to power supplied by an internal combustion engine.

A retractable power extension cord 38 may be mounted on the vehicle 10 in the vicinity of the exportable power outlet box 16. Providing a dedicated extension cord on the vehicle 10 ensures that an extension cord is always available to the user.

The retractable power extension cord 38 may be mounted inside a body panel or directly to an underbody component of the vehicle and is therefore generally not visible to a user during most operating conditions. In an embodiment, the retractable power extension cord 38 is mounted inside the side wall of the cargo bed of the vehicle 10. However, other vehicle mounting locations could include but are not limited to in a side, rear, or front exterior body panel or grille, behind or within an interior trim panel, at a headlamp or taillamp, on or near a hitch or bumper, etc.

The retractable power extension cord 38 may include a reel 40 and a retractable cord 42 that may be wound and unwound relative to the reel 40. The retractable cord 42 could include any length and/or wire gauge. In an embodiment, the reel 40 is a spring loaded reel that is capable of automatically winding the retractable cord 42 onto the reel 40, such as via spring tension forces.

Figure 4:
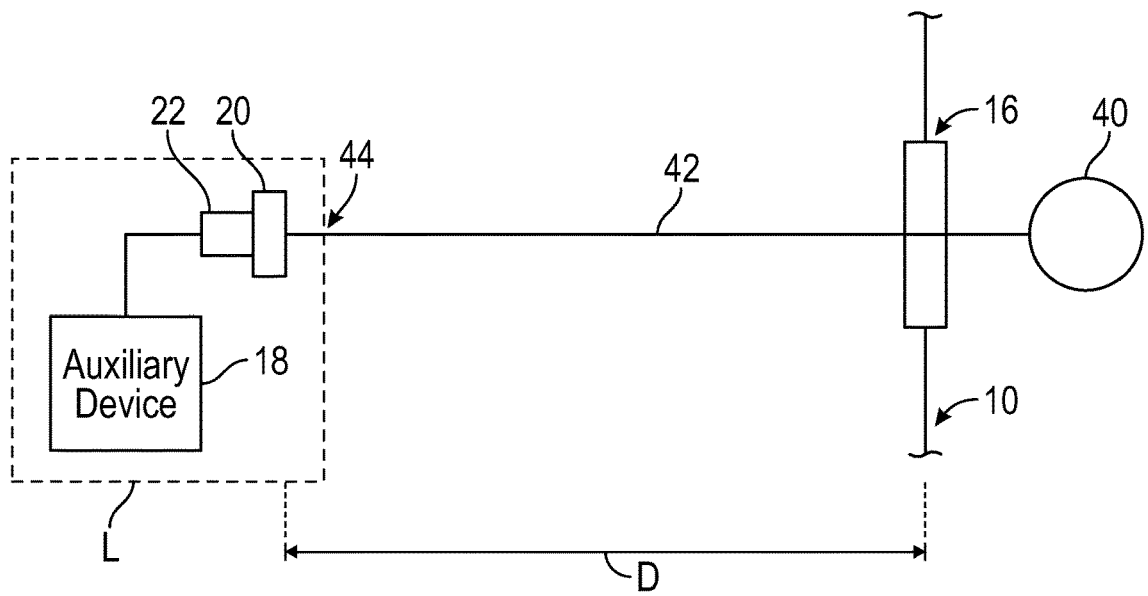
FIG. 4 schematically illustrates functionality associated with a retractable power extension cord of a motor vehicle.

Referring to FIG. 4, an end portion 44 of the retractable cord 42 may be connected to one or more of the electrical power outlets 20 of the exportable power outlet box 16. The electrical power outlet(s) 20 that are connected to the end portion 44 may be disengaged from the exportable power outlet box 16 and can then be pulled to a remote location L that is a distance D apart from the vehicle 10 by unwinding the extended retractable cord 42 from the reel 40. One or more auxiliary devices 18 can then be plugged into the electrical power outlets 20 for powering the auxiliary devices 18 at the remote location L.

The vehicle 10 could be equipped with one or more of the retractable power extension cords 38. The multiple retractable power extension cords 38 could include retractable cords of different lengths and/or gauges (e.g., 25 feet 14 AWG, 50 feet 12 AWG, 100 feet, 10 AWG, etc.).

Users may be unaware of the effect that an extension cord's length can have on the resistance created within the circuit, which can ultimately influence the efficiency of the power being transferred through the extension cord and any associated heat produced therein. This disclosure is therefore directed to vehicle remote power supply systems that include integrated features for addressing these issues.

Figure 5:
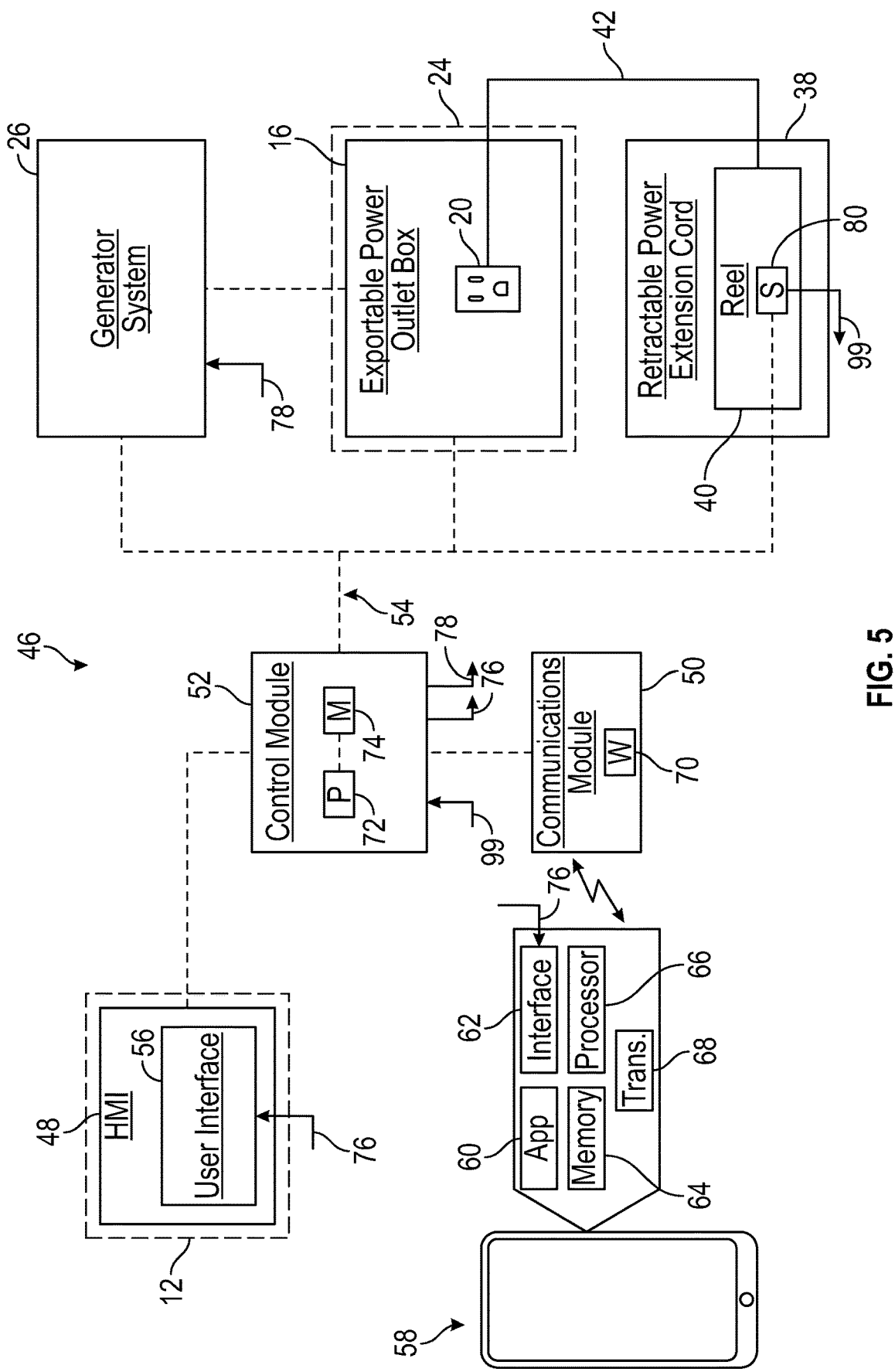
FIG. 5 schematically illustrates an exemplary remote power supply system for a motor vehicle.

FIG. 5, with continued reference to FIGS. 1-4, schematically illustrates a remote power supply system 46 that may be provided on the vehicle 10. The remote power supply system 46 may, for example, enable the vehicle 10 to operate in the power generation mode for powering one or more auxiliary devices 18 that are separate from the vehicle 10.

The remote power supply system 46 may include the exportable power outlet box 16, the generator system 26, the retractable power extension cord 38, a human machine interface (HMI) 48, a communications module 50, and a control module 52. These components may be interconnected and in electronic communication with one another over a communication bus 54. The communication bus 54 may be a wired communication bus such as a controller area network (CAN) bus, or a wireless communication bus such as Wi-Fi, Bluetooth®, Ultra-Wide Band (UWB), etc.

The HMI 48 may be located within the passenger cabin 12 of the vehicle 10 and may include various user interfaces for displaying information to the vehicle occupants and for allowing the vehicle occupants to enter information into the HMI 48. The vehicle occupants may interact with the user interfaces via touch screens, tactile buttons, audible speech, speech synthesis, etc. In an embodiment, the HMI 48 is part of an in-dash infotainment system of the vehicle 10. However, other configurations are further contemplated within the scope of this disclosure.

The HMI 48 may include one or more user interfaces 56 dedicated to functionality associated with the remote power supply system 46, and more particularly, to functionality associated with the exportable power outlet box 16 and/or the retractable power extension cord 38. The one or more user interfaces 56 may present power generation related information to a user. Non-limiting examples of the type of power generation information that may be displayed within the user interfaces 56 include the amount of power being drawn from each electrical power outlet 20, the efficiency of the power transfer through the retractable cord 42 (or another extension cord), which electrical power outlet 20 is connected to the retractable cord 42 of the retractable power extension cord 38 (if any), alerts related to overloading/overtemperature conditions, etc.

The one or more user interfaces 56 may further enable the user to enter various information into the HMI 48. For example, the user may enter various extension cord related parameters (e.g., cord length, gauge of wire, power rating, etc.), such as for situations in which the user plans to connect his/her own extension cord to one of the electrical power outlets 20. The one or more user interfaces 56 could additionally be used to save individual extension cord profiles that include a unique name or moniker (e.g., 50 ft yellow cord, etc.).

The user could alternatively or additionally interface with (e.g., over a cloud-based server system) the remote power supply system 46 with a personal electronic device 58 (e.g., a smart phone, tablet, computer, wearable smart device, etc.). The personal electronic device 58 may include an application 60 (e.g., FordPass™ or another similar application) that includes programming to allow the user to employ one or more user interfaces 62 for setting or controlling certain aspects of the remote power supply system 46. Power generation related information may be presented to the user within one or more of the user interfaces 62. The user may also enter various extension cord related parameters (e.g., cord length, gauge of wire, power rating, etc.), such as to account for situations in which the user plans to connect his/her own extension cord to one of the electrical power outlets 20. The application 60 may be stored in memory 64 of the personal electronic device 58 and may be executed by a processor 66 of the personal electronic device 58. The personal electronic device 58 may additionally include a transceiver 68 that is configured to communicate with the remote power supply system 46, such as via the communications module 50.

The user interface(s) 56 and/or the user interface(s) 62 may further be configured to allow the user to turn off power to any of the electrical power outlets 20 on demand. This may be a particularly useful feature during instances in which it may be undesirable to unplug the extension cord from either the electrical power outlet 20 or the device being powered.

The user interface(s) 56 and/or the user interface(s) 62 may further be configured to provide the user with the option of setting a specific time for which to turn power to any of the electrical power outlets 20 on or off.

The communications module 50 may be configured for achieving bidirectional communications between the remote power supply system 46 and the personal electronic device 58. For example, the communications module 50 may include one or more wireless devices 70 that is operable to facilitate communications between the user and the remote power supply system 46. In an embodiment, the wireless devices 70 are Bluetooth® Low Energy (BLE) transceivers configured to receive and/or emit low energy signals as a way to detect and communicate with participating users. However, other types of wireless devices (e.g., WiFi, V2V, etc.) are also contemplated within the scope of this disclosure.

The control module 52 may include both hardware and software and could be part of an overall vehicle control system, such as a vehicle system controller (VSC), or could alternatively be a stand-alone controller separate from the VSC. In an embodiment, the control module 52 is programmed with executable instructions for interfacing with and commanding operation of various components of the remote power supply system 46. Although shown as separate modules within the highly schematic depiction of FIG. 5, the HMI 48, the communications module 50, and the control module 52 could be integrated together as part of common module of the vehicle 10.

The control module 52 may include a processor 72 and non-transitory memory 74 for executing various control strategies and modes associated with the remote power supply system 46. The processor 72 may be a custom made or a commercially available processor, a central processing unit (CPU), or generally any device for executing software instructions. The memory 74 can include any one or combination of volatile memory elements and/or nonvolatile memory elements. The processor 72 may be operably coupled to the memory 74 and may be configured to execute one or more programs stored in the memory 74 based on various inputs received from other devices associated with the remote power supply system 46.

The control module 52 may be programmed to monitor power transfers occurring within the remote power supply system 46 and further to protect against various overload or overtemperature conditions that may be associated with transferring power through the retractable cord 42 or another extension cord connected to the exportable power outlet box 16. In an embodiment, the control module 52 may be programmed to calculate a maximum recommended power limit associated with passing power through the retractable cord 42 (or another extension cord supplied by the user) in order to protect against cord overloading conditions. For example, based at least on known extension cord parameters (e.g., cord length, gauge of wire, power rating, etc.), the control module 52 may calculate a maximum current that should be permitted to pass through the cord in order to reduce or even eliminate cord heat and/or voltage fluctuations during cord usage. The maximum current calculation may be obtained using known power equations, including but not limited to Ohm's Law, for example.

In another embodiment, the control module 52 may be programmed to command an alert 76 to the user when the power being passed through the retractable cord 42 (or another extension cord supplied by the user) is within a predefined percentage of the maximum recommended power limit of the cord. The alert 76 may take the form of a message that can be displayed on the one or more user interfaces 56 of the HMI 48 and/or the user interface(s) 62 of the personal electronic device 58. The alert 76 may further include prompts that are designed to entice the user to change the current cord setup, such as by plugging the auxiliary device(s) directly into the electrical power outlets 20, reducing the load by extending the unwound length of the extension cord, etc.

In another embodiment, the control module 52 may be programmed to command a shutdown signal 78 to the generator system 26 when the power being passed through the retractable cord 42 (or another extension cord supplied by the user) exceeds a predefined power overload threshold of the cord. The shutdown signal 78 instructs the generator system 26 to stop providing power to the exportable power outlet box 16 in order to alleviate the overload condition. In other embodiments, the control module 52 may command the shutdown signal 78 in response to a direct user request, a preset timer, a predicted weather event (e.g., heavy precipitation, etc.), etc.

In another embodiment, based at least on sensor input data 99 received from a sensor system 80 of the retractable power extension cord 38, the control module 52 may be programmed to calculate a maximum recommended power limit of the retractable cord 42 as derived based on a remaining coiled portion of the retractable cord 42. The remaining coiled portion represents the length of the retractable cord 42 that remains wound onto the reel 40 at any given point of usage.

In some implementations, the sensor system 80 may include a strain gauge that can be mounted to a retraction mechanism (e.g., a spring) of the reel 40. The strain gauge may be configured to measure a force of the retraction mechanism and then correlate that force (e.g., via one or more look-up tables stored in the memory 74) to infer the length of the remaining coiled portion of the retractable cord 42.

In other implementations, the sensor system 80 could alternatively or additionally include an optical scanner/mechanical counter that can be mounted to the reel 40. The optical scanner/mechanical counter may be configured to determine how many wheel revolutions of the reel 40 have occurred and then correlate the wheel revolutions (e.g., via one or more look-up tables stored in the memory 74) to infer the length of the remaining coiled portion of the retractable cord 42. Other implementations of the sensor system 80 could also be possible for determining the length of the retractable cord 42 that remains wound on the reel 40.

The control module 52 may command the alert 76 to the user when the power being passed through the retractable cord 42 is within a predefined percentage of the maximum recommended power limit. The alert 76 may prompt the user to unwind an additional amount of the retractable cord 42 from the reel 40, for example, thereby reducing the amount of inductive heat being created within the retractable cord 42. The control module 52 may further communicate the shutdown signal 78 to the generator system 26 when the power being passed through the retractable cord 42 exceeds a predefined power overload threshold of the retractable cord 42.

In yet another embodiment, based at least on sensor input data 99 received from the sensor system 80 of the retractable power extension cord 38, the control module 52 may be programmed to determine when a temperature associated with the retractable power extension cord 38 exceeds a predefined temperature threshold. Temperatures beyond the predefined temperature threshold may indicate that excessive heat is being generated during use of the retractable cord 42.

In some implementations, the sensor system 80 may include a temperature sensor mounted to the reel 40 of the retractable power extension cord 38. The temperature sensor may be configured to monitor a temperature associated with the retractable power extension cord 38.

The control module 52 may command the alert 76 to the user when a temperature increase of the retractable cord 42 exceeds a predefined temperature increase threshold. The alert 76 may prompt the user to unwind an additional amount of the retractable cord 42 from the reel 40, for example, thereby reducing the amount of inductive heat being created within the retractable cord 42. The control module 52 may further communicate the shutdown signal 78 to the generator system 26 when the temperature of the retractable cord 42 exceeds a predefined temperature threshold of the retractable power extension cord 38. Power transfer may be re-enabled after the overtemperature condition subsides.

The vehicle remote power supply systems of this disclosure may provide an integrated extension cord, thereby ensuring that an extension cord is always available to the user. The remote power supply system may independently monitor power usage through the extension cord separately from any other available outlets and may provide notice to the user if overloading or overtemperature conditions exist, thereby providing increased utility and functionality compared to prior systems. The user may thus become aware of minor efficiency losses via the system and can adjust settings accordingly to improve efficiency.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle remote power transfer system, comprising:
a vehicle surface;
an exportable power outlet box mounted to the vehicle surface and including an electrical power outlet;
a retractable power extension cord operably connected to the electrical power outlet and including a reel and a retractable cord,
wherein the retractable cord includes a first portion unwound from the reel and a remaining coiled portion wound onto the reel;
a control module programmed to determine a maximum recommended power limit of the retractable cord based on a length of the remaining coiled portion; and
a sensor system configured to infer the length of the remaining coiled portion based on a spring force or a number of wheel revolutions of the reel,
wherein the sensor system provides sensor input data to the control module for determining the maximum recommended power limit.

2. The vehicle remote power transfer system as recited in claim 1, wherein the electrical power outlet is movable to a location away from the exportable power outlet box by the retractable cord.

3. The vehicle remote power transfer system as recited in claim 1, wherein the control module is further programmed to command an alert when an actual amount of power being transferred through the retractable cord is within a predefined percentage of the maximum recommended power limit.

4. The vehicle remote power transfer system as recited in claim 3, wherein the alert is presented on a human machine interface or a personal electronic device that is operably linked to the vehicle remote power transfer system.

5. The vehicle remote power transfer system as recited in claim 1, wherein the control module is further programmed to communicate a shutdown signal to a generator system of the vehicle remote power transfer system when an actual amount of power being transferred through the retractable cord exceeds a predefined power overload threshold of the retractable cord or in response to a direct user request.

6. A vehicle remote power transfer system, comprising:
an exportable power outlet box including an electrical power outlet;
an extension cord connected to the electrical power outlet;
a human machine interface operable to receive a user input of a parameter associated with the extension cord,
wherein the human machine interface is part of a vehicle in-dash infotainment system;
a control module programmed to determine a maximum recommended power limit of the extension cord based at least on the parameter; and
a sensor system configured to infer a length of a remaining coiled portion of the extension cord based on a spring force or a number of wheel revolutions of a reel,
wherein the sensor system provides sensor input data to the control module for determining the maximum recommended power limit.

7. The vehicle remote power transfer system as recited in claim 6, wherein the parameter includes a cord length of the extension cord.

8. The vehicle remote power transfer system as recited in claim 6, wherein the parameter includes a gauge of wire provided within the extension cord.

9. The vehicle remote power transfer system as recited in claim 6, wherein the parameter includes a power rating of the extension cord.

10. The vehicle remote power transfer system as recited in claim 6, wherein the control module is further programmed to command an alert when an actual amount of power being transferred through the extension cord is within a predefined percentage of the maximum recommended power limit.

11. The vehicle remote power transfer system as recited in claim 10, wherein the alert is presented on the human machine interface or a personal electronic device that is operably linked to the vehicle remote power transfer system.

12. The vehicle remote power transfer system as recited in claim 6, wherein the control module is further programmed to communicate a shutdown signal to a generator system of the vehicle remote power transfer system when an actual amount of power being passed through the extension cord exceeds a predefined power overload threshold of the extension cord or in response to a direct user request.

13. The vehicle remote power transfer system as recited in claim 6, wherein the exportable power outlet box is mounted to a side wall of a vehicle cargo bed.

14. The vehicle remote power transfer system as recited in claim 11, wherein the alert includes a message displayed on the human machine interface or the personal electronic device.

15. The vehicle remote power transfer system as recited in claim 1, wherein the vehicle surface is provided by a side wall of a vehicle cargo bed, and the retractable power extension cord is mounted inside the side wall.

16. The vehicle remote power transfer system as recited in claim 15, wherein the electrical power outlet is configured to receive a plug of an auxiliary device, wherein an end portion of the retractable cord is connected to the electrical power outlet, and further wherein the electrical power outlet is disengagable from the exportable power outlet box for locating the electrical power outlet at a distance apart from the vehicle cargo bed.

17. The vehicle remote power transfer system as recited in claim 1, wherein the sensor system includes a strain gauge that is configured to infer the length of the remaining coiled portion based on the spring force of a retraction mechanism of the reel.

18. The vehicle remote power transfer system as recited in claim 1, wherein the vehicle surface is located inside a vehicle passenger cabin.

* * * * *